May 24, 1949.  H. A. FLOGAUS  2,470,924
FASTENING DEVICE
Filed Aug. 29, 1946
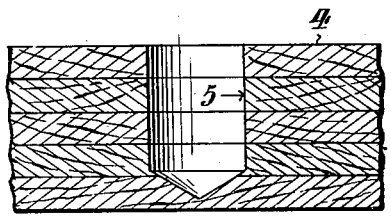
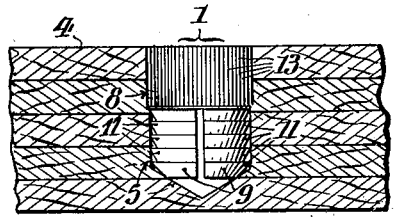
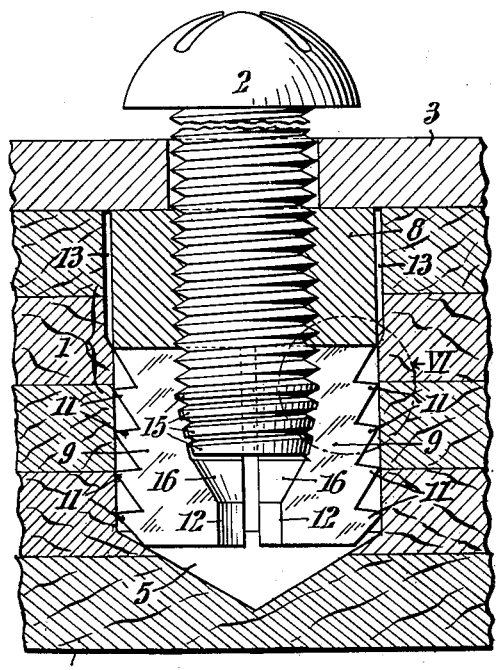
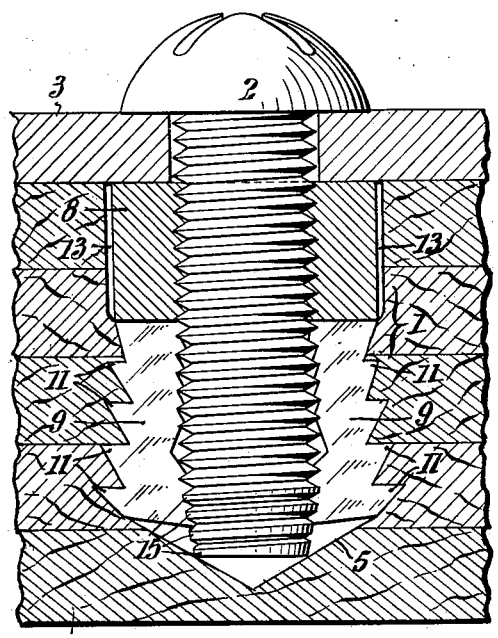
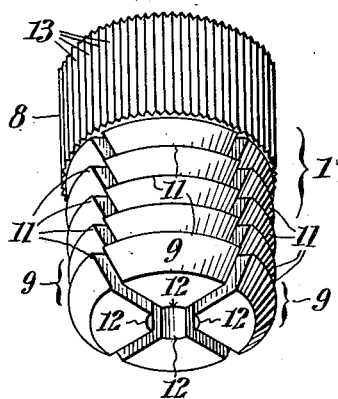
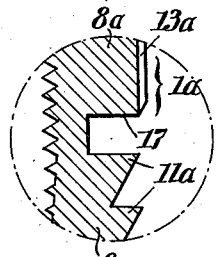
INVENTOR:
Howard A. Flogaus,
BY Paul & Paul
ATTORNEYS.

Patented May 24, 1949

2,470,924

UNITED STATES PATENT OFFICE 2,470,924

FASTENING DEVICE

Howard A. Flogaus, Wallingford, Pa., assignor to South Chester Corporation, Chester, Pa., a corporation of Delaware Application August 29, 1946, Serial No. 693,678

1 Claim. (Cl. 85—2.4)

This invention relates to a fastening device which is adapted to be anchored within a panel of wood, ply-wood, plastic, or like material and which is internally threaded to receive a screw or bolt whereby articles of various sizes and shapes may be secured to the panel. Fastening means of this character are particularly useful where hinges, brackets or other articles are applied to a wall and where it is desired that such articles be capable of being assembled or removed as often as desired without the destructive wear which results from the repeated application and removal of a conventional form of screw.

One object of the invention is to provide an anchor nut of this character which can be readily inserted and expanded within a bore in a panel or the like and which when expanded becomes firmly anchored resisting dislodgement as a result of vibration, or of forces tending to pull out the nut in the direction of its axis, or of torque tending to turn the nut within the bore to which it is applied.

Another object of the invention is to provide an anchor nut which is adapted to be expanded by torque applied by means of a threaded expander which when screwed through the nut causes expansible prongs formed at the inner end of the nut to bend at a particular zone and in a particular predetermined direction so as to bite into the surrounding material in a manner effective to prevent dislodgement.

Another object of the invention is to provide exterior and interior formations on a nut of the character described which coact with the threaded expander to increase the holding power of the nut with respect to the panel within which it is lodged, as well as to increase the holding power of the threaded expander so that when such parts are finally assembled they will all be securely held in place.

Other advantages characterizing the present invention including those derived from simplicity and economy of manufacture will become more apparent from the description of a practical embodiment of the invention and a modification thereof which follows hereinafter having reference to the accompanying drawings.

Of the drawings:

Fig. 1 represents in cross section a panel bored to receive an anchor nut of this invention;

Fig. 2 represents a similar view of the panel with an anchor nut inserted therein, the nut being unexpanded.

Fig. 3 represents an enlarged cross section of the panel and anchor nut showing a plate in readiness to be attached to the panel by means of an expander screw which has been inserted in the nut and screwed to a position where it is partially seated.

Fig. 4 is a view similar to Fig. 3 but showing the anchor nut in its final expanded condition and the expander screw turned to its fully seated position;

Fig. 5 is a bottom perspective view of the anchor nut in its unexpanded condition; and Fig. 6 represents an enlarged cross section of a portion of the anchor nut, being the portion designated by the circular dot-and-dash line shown at VI in Fig. 3, illustrating a modification in the shape of the anchor nut.

As shown in the drawings the anchor nut 1 and its companion expander screw 2 serve as a means for attaching a member such as a plate 3 to a panel 4 which may be constructed of wood, plywood, plastic or soft metal. Prior to insertion of the anchor nut the panel 4 is bored as indicated at 5 in Fig. 1, the bore having a diameter slightly less than that of the anchor nut 1.

The anchor nut, as shown in Figs. 2 to 5, comprises an internally threaded tubular shank 8 of relatively soft metal slotted at one end to form a number of expansible prongs 9. The prongs 9 are provided with sharply pointed barbs 11 disposed externally along the length thereof and have inwardly projecting shoulders 12 at their free ends beyond the portion which is internally threaded. Throughout the unslotted portion of the shank 1 the nut is longitudinally serrated at its exterior surface, as indicated at 13, the serrations being closely spaced and desirably formed by V-shaped notches which produce sharply pointed ridges and corresponding valleys as shown in Fig. 3.

The relation of the outside diameter of the prongs to the maximum (ridge) and minimum (valley) diameters of the serrated portion of the nut is such that when the anchor nut is inserted within the bore 5 of the panel 4, as shown in Fig. 2, the prongs 9 by reason of their slightly larger diameter enter the bore with a forced fit and the serrated portion 13 of the nut bites into the surrounding material in such manner that a considerable resistance is offered against any turning of the nut about its axis within the panel.

The expander 2 for the anchor nut 1 is preferably in the form of a hardened steel screw having threads of uniform pitch and formation throughout substantially the length thereof but the threads at the tip of the screw differ as to cross-sectional characteristics from those formed throughout the remainder of its length in that they are flattened as indicated at 15 to produce a tapered extremity. Similarly the internal threads of the anchor nut are imperfectly formed in the region above the shoulders 12 where the inside diameter of the nut is reduced. The tip of the expander screw 2 may take the same form as that of the tap drill used for cutting the internal threads of the anchor nut 1, or it may be slightly smaller, but the threads at the tapered tip of the screw are designed to match the internal threads of the anchor nut.

When the expander screw 2 is applied to the anchor nut 1 with the parts to be fastened assembled together as shown in Fig. 3 of the drawings the screw can be turned to the position indicated in that figure without causing any expansion of the prongs 9, but further turning will force the screw through the tapered portion 16 adjacent to the shoulders 12 of the anchor nut with incidental cutting of threads through that portion of the nut. When screwed to its fully seated position the expander screw 2 penetrates the end of the anchor nut and assumes the position shown in Fig. 4.

As a result of the special formation at the interior the anchor nut 1 the tightening of the expander screw 2 causes a gradual radial expansion of the prongs 9 which are caused to bend about the relatively weak zone where the prongs join the unslotted portion of the shank 8 of the nut. Such expansion causes the barbs 11 which are sharply pointed and of saw toothed configuration, being formed by annular V-shaped cuts in the exterior cylindrical surface, to bite into the surrounding material. Moreover, the barbs 11 are pointed in the direction in which the prongs 9 are adapted to bend about the zone of weakness, the outer cutting faces of the barbs being disposed in planes substantially at right angles to the axis of the nut when the prongs have been expanded by an expander such as shown in Fig. 4, and being disposed at an angle inclined downwardly when the prongs are in the unexpanded position as in Fig. 3. The angle of downward inclination of the outer cutting faces is such that engagement of tapering surfaces 16 with an expander of substantially uniform cross section radially expands the cutting faces to a position substantially at right angles to the axis of said nut as shown in Fig. 4. It will also be noted in the drawings that the barbs 11 are provided with inner faces which are inclined at an acute angle to the axis of the nut. As an incident to radial expansion and bending of the prongs said barbs will thus be caused to chisel upwardly into the surrounding material without appreciable crushing of the material adjacent to said outer cutting faces. As shown in the drawings, I have also provided an anchor nut in which the outside diameter of the prongs is greater than the minimum diameter of the serrated portion but less than the maximum diameter of the serrated portion when the nut is unexpanded. At the same time I have provided an anchor nut in which the outside diameter of the prongs is greater than the serrated portion when the nut is expanded. This results in each barb functioning as a chisel so that it easily penetrates the surrounding material without deflection from the predetermined direction in which the prongs are adapted to bend, and without crushing the material adjacent to the outer cutting faces of the barbs. Accordingly a most effective grip is produced between the anchor nut and the material within which it is embedded so that it has a considerable resistance to tensile pull. The slots between the prongs also act as keyways and as they become filled with material squeezed therein as a result of the expansion of the prongs this adds to the resistance against torque afforded by the longitudinal serrations 13. Hence the pull-out strength and torsional resistance of the anchor nut are enhanced as the expander screw is turned to its fully seated position.

It is found that there is a natural tendency for the prongs 9 to spring back towards their original positions. This force together with the engagement provided between the threaded tip of the expander screw and the surrounding imperfect threads, causes the expander screw 2 to be more firmly gripped as it penetrates the end of the anchor nut, and such grip is augmented by the changing pitch which results as the prongs bend away from their original position. The expander screw 2 is thus held against dislodgement due to vibration, but it may nevertheless be withdrawn and re-applied to the anchor nut repeatedly without impairing its effectiveness.

In Fig. VI a modification of the anchor nut is represented in which the zone of weakness is exaggerated by forming a circumferential groove 17 in the shank 8a of the anchor nut at the point where the prongs 9a join the body of the shank. The thin section thus produced insures that a sharp angular bend will result at the weakened zone when the prongs 9a are expanded.

If desired the expansion of the prongs of the anchor nut may be effected by an expander screw of hardened metal which is adapted to be withdrawn from the nut and replaced by a screw of somewhat softer metal when the parts to be fastened are finally assembled, or the same screw may serve both as the expander and as the screw used in the final assembly. In either event the expansion of the prongs of the anchor nut is accomplished in such manner that its companion screw may be repeatedly inserted and withdrawn without impairing the function of the nut or destroying the threads of the screw.

Although I have described a specific form of anchor nut and expander screw and a modification of the nut which may be used to advantage, it will be apparent that the shape of these elements may be varied considerably to meet different conditions, and that certain features of the fastening device of my invention may be used without use of all of the features herein described, all without departing from the spirit of the invention as defined in the annexed claim.

Having thus described my invention, I claim:

A fastening device comprising a tubular anchor nut formed of relatively soft metal, a plurality of closely spaced external serrations forming longitudinally directed ridges and valleys at the outer end of said nut, an internally threaded portion formed in the outer end of said nut, a radially split inner end portion comprising a plurality of expansible prongs each of said prongs having a series of sharply pointed barbs of angular cross section, said series of barbs extending from the inner end substantially to the serrated portion, said prongs having interior tapering unthreaded surfaces converging towards the inner end of the nut and adapted to be engaged by an expander, and said barbs having outer cutting faces disposed at an angle inclined downwardly with respect to the axis of said nut, the angle of inclination being such that engagement of said tapering surfaces with an expander of substantially uniform cross section radially expands said outer cutting faces to a position substantially at right angles to the axis of said nut, and inner faces on said barbs inclined at an acute angle to the axis of said nut, whereby as an incident to radial expansion and bending of the prongs said barbs will be caused to chisel upwardly into the surrounding material without appreciable crushing of the material adjacent to said outer cutting faces, and the barbed prongs having an outside diameter, prior to expansion, greater than the minimum diameter of the serrated portion, as defined by said valleys, but less than the maximum diameter of said serrated portion, as defined by said ridges.

HOWARD A. FLOGAUS.

REFERENCES CITED

The following references are of record in the file of this patent:

UNITED STATES PATENTS

| Number | Name | Date |
| --- | --- | --- |
| 1,248,005 | Pleister | Nov. 27, 1917 |
| 1,265,246 | Pleister | May 7, 1918 |
| 1,751,818 | Karitzky | Mar. 25, 1930 |
| 2,040,385 | Kellogg | May 12, 1936 |

FOREIGN PATENTS

| Number | Country | Date |
| --- | --- | --- |
| 20,295 | Great Britain | Sept. 6, 1912 |
| 438,873 | Great Britain | Nov. 18, 1935 |
| 495,653 | Great Britain | Nov. 17, 1938 |